Nov. 28, 1950  M. E. NYE ET AL  2,531,888
APPARATUS FOR MOLDING PLASTIC MATERIAL
Filed Dec. 4, 1948  2 Sheets-Sheet 1

INVENTORS
Maurice E. Nye
Harry E. Nye
BY
Woodling and Krost
attys.

Nov. 28, 1950    M. E. NYE ET AL    2,531,888
APPARATUS FOR MOLDING PLASTIC MATERIAL
Filed Dec. 4, 1948    2 Sheets-Sheet 2

INVENTORS
Maurice E. Nye
BY Harry E. Nye
Stoodling and Krost
attys

Patented Nov. 28, 1950

2,531,888

UNITED STATES PATENT OFFICE 2,531,888

APPARATUS FOR MOLDING PLASTIC MATERIAL

Maurice E. Nye and Harry E. Nye, Barberton, Ohio, assignors to The Nye Rubber Company, a corporation of Ohio Application December 4, 1948, Serial No. 63,458

5 Claims. (Cl. 18—30)

This invention relates to apparatus for molding plastic material and is of especial advantage in the molding and vulcanizing of small rubber articles such, for example, as rubber toy wheels which are chosen for the purpose of illustration herein.

When molded in an ordinary two-part mold, by forcing the two mold sections toward each other with an excess of rubber between them to provide high pressure upon the rubebr in the mold cavities, the excess of rubber prevents the two mold sections from coming all the way together and results in mold fins on the product which are required to be removed, and, especially in the case of very small articles, the cost of removing the mold fins is an undesirably large percentage of the total cost of the product.

Further, in the case of a plastic material such as a rubber composition containing a comminute filler, the resistance to flow in a narrow passage is not merely a direct, simple ratio to the distance of flow, but accords to some type of mathematical progression, resistance increasing static pressure and static pressure increasing resistance. Therefore, filling an intricate mold cavity from one or two major openings requires very high pressure and temperature, and for that reason alone many molding devices now in use are very difficult to operate, and produce much scrap.

A further problem little understood and difficult to remedy is trapped air in the mold cavities of a rubber mold. Scrap results when trapped air becomes compressed and prohibits the rubber or other plastic from filling out the entire cavity.

Therefore, an object of this invention is to reduce the cost of molded articles by avoiding the forming of a large mold fin on the article.

Another object of this invention is to provide molded articles with only such light mold fins at any position thereon that they will be unobjectionable or can be removed inexpensively by a tumbling operation, or light buffing.

Another object of this invention is to provide a maximum rubber supply for mass action at the beginning of the molding step, and a minimum of scrap per molded article at the end of the molding step.

A still further object of this invention is to provide an improved feed for a plastic molding assembly, said feed eliminating elaborate and expensive injection mechanism.

Yet another object of the invention is to feed a rubber compound into the molding chambers through highly restricted passageways in a mold assembly in order that the rubber compound will be evenly heated throughout and thereby have an even consistency without cold viscous portions, and equally fill all portions of the molding chambers.

Another object of the invention is to provide molding plates having filling gates therethrough, wherein the openings into the filling gates cover a large portion of the surface of the plate and provide lateral anchorage for a slab of rubber compound pressed toward the surface.

A still further object of the invention is to provide filling gates into the molding chamber, the gates having a progressively smaller cross-sectional area, whereby a funneling action is accomplished to increase the pressure and improve the flow of the compound through the gates into the molding chamber.

Another object of the invention is to feed rubber compound in thin sheet form into a molding chamber, the thin sheet form placing the rubber in intimate contact with the molding plates for thorough preheating.

Other objects and a fuller understanding of the invention may be had by referring to the following description and claims, taken in conjunction with the accompanying drawings, in which:

Figure 4:
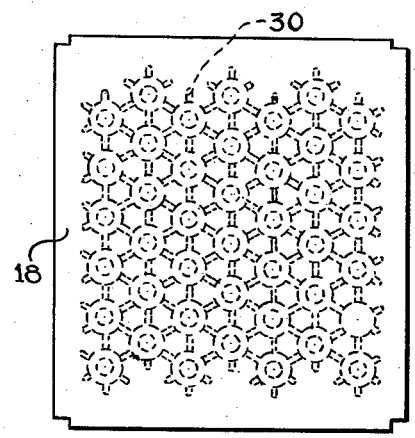
Figure 4 is a plan view of a mold plate having mold cavities constituting half a mold chamber for toy wheels.
Figure 5:
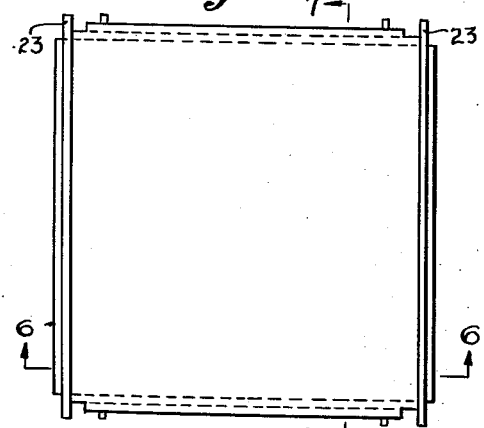
Figure 5 is a top plan view of a mold assembly using two mold couples, the first mold couple comprising the plates of Figures 1 and 2, and the second mold couple comprising the plates of Figures 3 and 4.
Figure 6:
Figure 6 is a section of the mold assembly of Figure 5 along line 6—6.

This application can best be understood by referring to the relative position of the parts in Figure 4, but describing and illustrating the parts individually and in enlarged detail. It is to be understood that molding plates for toy automobile wheels are being illustrated by way of example only, and that the invention is applicable to a wide variety of molded articles.

Figure 1:
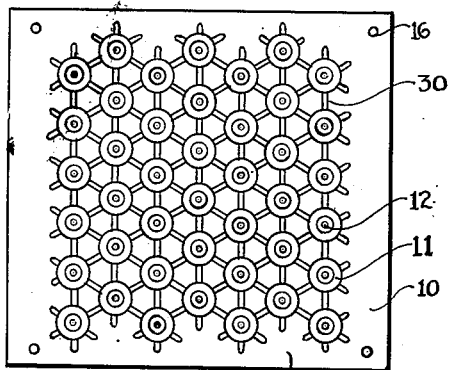
Figure 1 is a plan view of a mold plate having mold cavities constituting half a mold chamber for toy wheels, and embodying and adapted for the practice of the invention in its preferred form.

Referring to Figure 1 of the drawings, the lower mold plate, referred to as the first mold plate section, is indicated by reference character 10. In the illustrated embodiment, the mold plate section 10 is a steel plate having a contact surface 33. The contact surface 33 is formed with cavities 11, each cavity being adapted to mold half of the external surface of a wheel. In the floor of each cavity 11 is mounted a central molding core or pin 12 adapted to mold an internal axle opening in the wheel.

Figure 2:
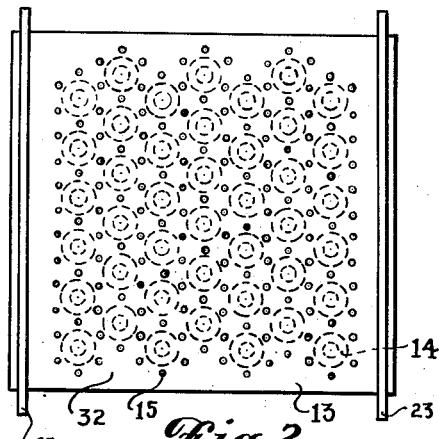
Figure 2 is a plan view of a mold plate having mold cavities constituting half a mold chamber for toy wheels, and having filling gates therein.

Another, or top mold plate section, is illustrated in Figure 2 and is referred to as the second mold plate section. The second mold plate section is indicated by reference character 13. The plate section 13 has an external surface 31 and a contact surface 32. The contact surface of the second mold plate section 13 is formed with cavities 14, each adapted to mold the other half of the external surface of the wheel. The cavities 11 and 14 together define a molding chamber 20. The cavities 11 and 14 on the first and second mold plate sections 10 and 13 are aligned by means of dowel pins 16 with contact surfaces 33 and 32 thereof in contact with one another. The first and second mold plate sections, when mated together, constitute a molding couple.

In every molding operation whether it is casting of iron, molding of rubber, or any other type, there is always the twin problem of filling the molding chamber and removing the excess stock after molding. These problems are much more involved than they may appear to the average mechanic who has never faced the problem.

Figure 7:
Figure 7 is a section of the mold assembly of Figure 5 along line 7—7.
Figure 12:
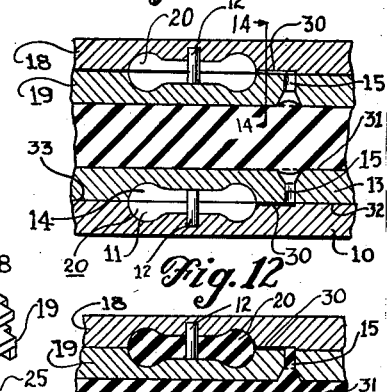
Figure 12 is a broken-away section of the mold assembly taken along a line indicated by the line 5—5 on the one plate of the assembly illustrated in Figure 8, the slab of uncured rubber being shown in its position relative to the mold couples at the instant of the beginning of the molding operation.
Figure 13:
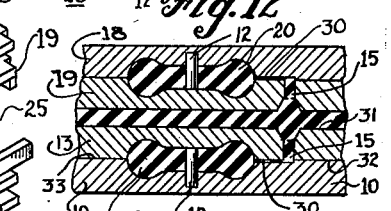
Figure 13 is a view similar to Figure 12 at the end of the molding operation.
Figure 14:
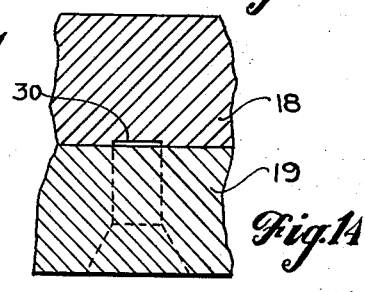
Figure 14 is a broken-away section along the line 14—14 of Figure 12.

In Figure 7 of the drawing, which is an enlarged portion of plate 10 of Figure 1, very small groove recesses 30 are illustrated extending from each of the mold cavities 14 to another cavity 14. The extremely small dimension of the recesses 30 may be seen in the Figure 14. In Figure 2, the mold plate 13 is shown with filling gates 15 extending therethrough from the external surface 31 to the contact surface 32. The filling gates 15 are tapered and extend, as illustrated in the Figures 12, 13 and 14, from the external surface 31 to the contact surface 32. The filling gates 15 are positioned to coincide with the groove recesses 30 in the plate 10. Therefore, as illustrated in Figures 12 and 13, the filling gates 15 and the groove recesses 30 provide a continuous passageway from the external surface 31 of the plate 13 into the molding chamber defined by the cavities 11 and 14.

The molding plates 10 and 13 as described constitute a molding couple. The plates 10 and 13 may be preliminarily assembled in face-to-face relation with the contact surface 32 of plate 13 in contact with the contact surface 33 of plate 10. Dowel pins 16 accurately align the cavities 11 and 14 with respect to one another, as well as the openings of the filling gates 15, with respect to the groove recesses 30. This molding couple is a complete unit in itself and may be used by placing a slab of uncured rubber compound in contact with the external surface 31 of plate 13 and pressing the slab of rubber compound toward the external surface 31 in a heated press. The slab of rubber compound will become more plastic under heat, and may be forced into the filling gates 15 and through the groove recesses 30 into the molding chambers.

Figure 15:
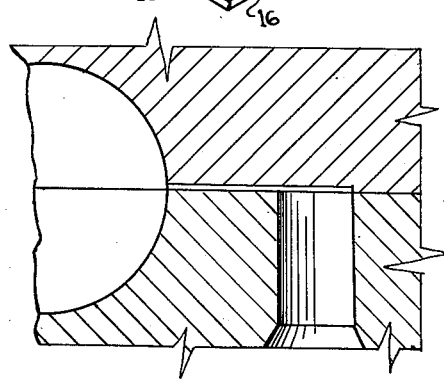
Figure 15 is a portion of Figure 13 in the area of one filling gate and molding chamber, enlarged to emphasize the extreme small cross-sectional area of the feeder tubes relative to the molding chamber.

As the rubber compound passes through the groove recesses 30 it flows in very small ribbon cross section, and therefore is in intimate contact with the hot mold plates. The rubber compound is thereby uniformly heated. Further, as illustrated best in Figures 14 and 15, the groove recesses 30 are in the order of about .0010 inch deep and are preferably as wide as the small end opening of the filling gates, although in some instances they may be wider, and may be as much as $1/32$ inch deep. In other words, the groove recesses 30 when capped by the mating plate section, are very small and highly restricted passageways bearing a high ratio with respect to the area of the small end of the gates. Preferably, the larger the filling gate the larger the ratio, but in most instances the ratio should preferably remain about 1:10. This ratio has the effect of greatly increasing the velocity of flow through the groove recesses with respect to the flow through the filling gates, and helps to fill the molding chamber smoothly and evenly.

Figure 8:
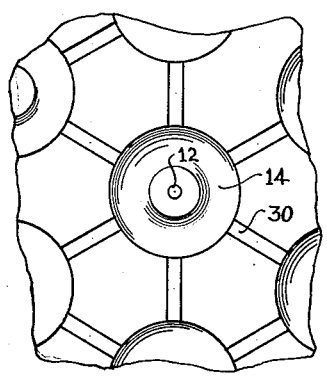
Figure 8 is an enlarged portion of the plate of Figure 1 illustrating one arrangement of radiating grooves adapted to conduct flowable plastic into the mold chamber.
Figure 9:
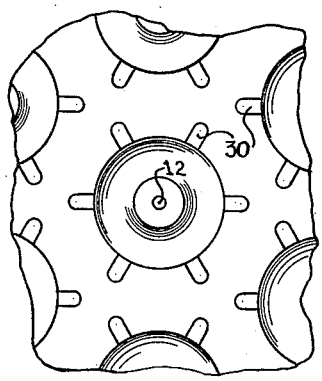
Figure 9 is a modification of the arrangement of the radiating grooves.
Figure 10:
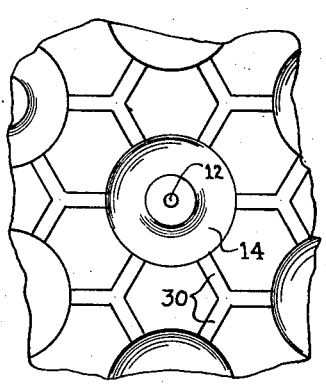
Figure 10 is still another modification of the arrangement of the radiating grooves.

Figures 9 and 10 of the drawings illustrate two alternative methods of providing the groove recesses in the face of the molding plate 10. In the Figure 8, the recesses extend in straight lines between the various cavities 14, and a filling gate is adapted to terminate substantially in the center of each recess between two particular cavities 14. Therefore, each filling gate is adapted to provide a flow of rubber compound into two adjacent mold cavities 14, and on the other hand each cavity 14 has the advantage of being served by a plurality of recesses 30 entering at radial points around the periphery thereof. In some instances, the illustrated dual function of one filling gate is not the most desirable, and therefore a plurality of individual radiating grooves 30 as illustrated in Figure 9 may be provided. The mold plate 13 must then be provided with filling gates to coincide with each of the individual radiating recesses. In Figure 10, a further alternative is provided in which one filling gate enters through the mold plate 13 at a common junction of three groove recesses 30 and thereby serves three individual cavities. The principle of operation of the three illustrated alternatives is substantially the same, and other modifications may readily be provided within the scope and purpose of this invention.

Figure 3:
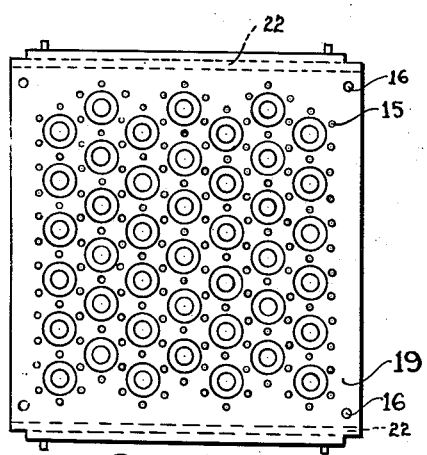
Figure 3 is a plan view of a mold plate having mold cavities constituting half a mold chamber for toy wheels, and having filling gates therein.

The preferred embodiment of this invention employs a double-deck unit of two molding couples and thereby permits the use of a large slab of rubber without undue waste, because two sets of molding chambers must be filled and therefore a large slab of rubber 25 can be placed between the molding couples at the start of the molding process and yet only a minimum amount of scrap will remain at the end of the molding process. Figures 3 and 4 illustrate the individual mold plates 18 and 19 which constitute a second molding couple which is substantially the exact operative equivalent of the first molding couple.

The Figures 12 and 13 illustrate in cross section, the entire molding apparatus as comprising the described first molding couple including mold plate sections 10 and 13, and the second molding couple including mold plate sections 18 and 19. The plate section 18 corresponds exactly to the plate section 10 of the first molding couple in an inverted position, and the plate section 19 corresponds exactly to the plate section 13 in an inverted position. In other words, insofar as the fundamental features and operation are concerned, the second molding couple is exactly the same as the first molding couple in an inverted position. As a matter of fact, the assembly as illustrated may be turned over and the first molding couple would then be the inverted couple. If the assembly were inverted, the operation of the filling gates and recesses, the anchor effect of the plurality of filling gates, and all other features and operations of the invention would remain and operate.

The Figures 12 and 13 illustrate the relative position of the first and second molding couples before the molding process is begun and after the molding process has finished. A slab of unvulcanized rubber 25 is placed between the molding couples as illustrated, and heat and pressure are applied to the molding couples to force the uncured rubber through the gates 15 and groove recesses 30 into the molding chambers 20, and cause a curing action to cure the rubber in the molded form. The slab 25 can be relatively large because of the double-deck construction of this improved molding assembly, without unduly wasting the rubber as vulcanized scrap. In other words, there is a definite amount of rubber required to fill the molding chambers 20 and the recesses 30 and filling gates 15. In addition to that amount of rubber required, an excess of rubber must be used to prevent the forcing means from contacting the external face of the plate section. The excess is required because a constant pressure must be maintained upon the rubber until it is entirely cured within the molding chambers. If the forcing means is permitted to contact the external face of the plate section, then the pressure will not be properly maintained within the molding chamber.

Furthermore, for a reason not fully understood by the applicant, a large mass of rubber provides some sort of mass action which tends to force more rubber compound into the filling gates 15 than can be conducted by the groove recesses 30. The tapered form of the gates 15 also aids in funneling an excess of rubber in attempting to force the excess into the groove recesses 30. The combined effect of the large mass action with the tapered form of the filling gates 15 and the increased velocity because of the small ratio size of the groove recesses 30 assures complete filling of the molding chambers without entrapped air. Figure 13 illustrates the relative position of the molding couples, and the relative thickness of the scrap at the end of the molding process. It is plainly seen that the amount of scrap is considerably less per molding chamber than could possibly be obtained by a single molding couple.

The two plate sections of each couple being very smoothly and accurately faced and preliminarily assembled in face-to-face relation, the two couples of mold sections are adapted to be forced toward each other regardless of whether only one molding chamber 20, or several chambers are to be filled. Thus, two important functions are provided with the same construction:

(1) When the press first begins to close, the unvulcanized rubber slab 25 is pressed lightly and portions thereof sink into the various gates 15. Because of this preliminary indenting effect, the sheet of stock is firmly interlocked with the external faces of the second mold plate sections, and each small localized area behaves like a separate piece of stock. Very little side movement is experienced tending to force the rubber out between the two molding couples. There is some such tendency, of course, and an excess thickness of sheeted stock is provided to assure filling the molding chambers, but this slight excess is easily controlled.

(2) The mold chamber fills better and produces fewer pieces of scrap caused by entrapped air in the mold. The reason why such a plurality of small feeder tubes to provide multiple feeding has proven so successful is not fully understood, but several years experience with molds having only one entry, and the improvement noted in recent months with the improved mold disclosed herein, has provided ample proof that a distinct improvement has resulted. The described mass action and excess stock undoubtedly are contributing factors, as well as the filling of the molding chambers from opposing sides thereof, and the increased velocity produced by the small groove recesses 30.

Figure 11:
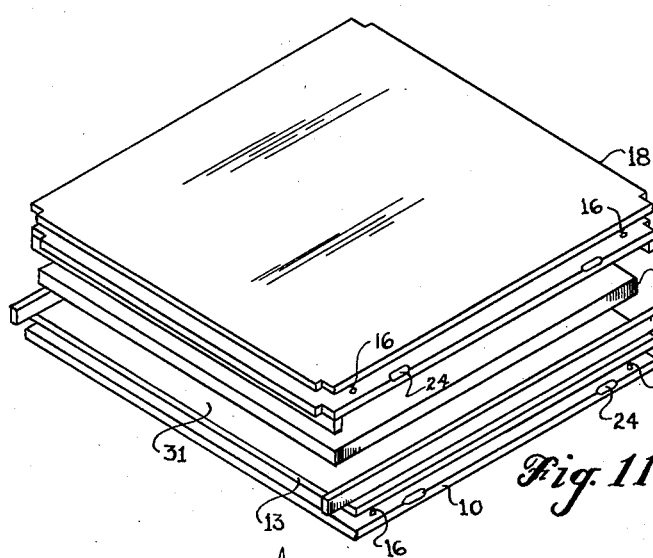
Figure 11 is an exploded perspective view of the mold assembly of Figure 5, and including a slab of uncured rubber compound in the proper relative position with respect to the mold couples.

In the operation of the apparatus, the lower mold couples, comprising plates 10 and 13, are assembled in close fitting face-to-face relationship, with cavities 11 and 14 held in proper registration by the dowels or pins 16. A sheet or slab 25 of unvulcanized rubber composition is laid upon the external face 31 of plate member 13. The upper mold couples, comprising plates 18 and 19, are assembled in like manner and are brought down upon the sheet of rubber. See Figure 11. In actual construction of the preferred embodiment of this invention, in which the two molding couples are used in inverted relationship as illustrated, end guards 22 and 23 are attached to the plates 19 and 13 respectively and serve to help restrain flow of the rubber composition from between the two mold couples. Furthermore, end guards 22 and 23 serve to substantially align the recesses of the filling gates 15. After the upper and lower mold couples are assembled, the assembly is placed in a vulcanizing platen press, and the press is closed upon the assembly to force the rubber composition to flow into the gates 15 and fill the molding chambers. The assembly is then held in the press for a sufficient length of time to effect vulcanization of the rubber, the pressure being released and re-applied from time to time if desired, as in the practice sometimes employed in the case of ordinary molds to permit air or gas to escape and to assure complete filling of the mold cavities.

After vulcanization is completed, as illustrated in Figure 13, the press is opened, the assembly is removed from the press if the type of press is such as to require it, and the mold couples are separated and the finished wheels and the scrap rubber between the two mold couples are removed.

In this part of the operation the preferred procedure is to first separate the top and bottom mold plates 10 and 18 from the plates 13 and 19 and thereby withdraw the molding pins from the wheels. Such separation is aided by notches 24 in plates 10 and 18 into which a pry bar may be inserted. The integral relation of the wheels to the scrap rubber at the ends of the grooves 30 causes the wheels to be retained in the cavities of the two plates 13 and 19, and thereby permits the pins 12 to be withdrawn from the molded articles in one simple action. The construction of the mold to provide sufficient integral connection between the scrap in the filling gates with the finished article to thus retain the finished article, is a feature of this invention which makes the structure operative and highly desirable for mass production. If the molded articles were not retained in the cavities 14, then they would have to be individually withdrawn off of the pins 12 in the cavities 11. Therefore, the scrap remaining between the plates 13 and 19 and within the filling gates 15 and grooves 30, serves the very desirable function of uniting all of the molded articles in one integral unit and therefore permits the pins 12 to be withdrawn from the finished article.

The two plates 13 and 19 are then forced apart to break the thin annular webs of rubber connecting the scrap in the filling gates 15 with the scrap in groove recesses 30 leading to the wheels of one or the other of the plates 13 and 19, after which the web of scrap is pulled free from the wheels in the other plate. That is, plates 13 and 19 are forced apart by pry-bar action, and, of course, the scrap remaining between the mold couples has only a limited flexibility and therefore will tear away from the scrap in groove recesses 30 leading to wheels in one or the other of the plates. Thereafter, the operator may grasp the web of scrap and peel it from the external surface 31 of the other plate and rupture the bond between the scrap in the gates 15 and the scrap in the groove recesses 30 in the remaining plate. Thus, the finished wheels are left in the cavities of the plates 13 and 19, but are completely separated from the scrap and the pins 12, except for very fine annular fins which are easily removed.

The finished wheels, substantially without mold fins, are then punched from the cavities in which they have been retained, preferably by means of a gang punch or other suitable removing means.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Molding apparatus comprising, a first molding couple, said couple including a first mold section having a contact surface with at least a mold cavity extending inwardly of the said section from the said contact surface, a second mold section having a contact surface with at least a mold cavity extending inwardly of the said section from the said contact surface, said second mold plate having a back surface, one of said mold sections having a plurality of groove recesses each radiating outwardly from said at least a mold cavity therein, said second mold section having a plurality of filling gates opening through the plate from the back surface thereof and each registering with one said groove recess, said contact surfaces of the first and second mold sections being adapted to contact in close fitting engagement and position the said mold cavities of the first and second mold sections in registration to define a molding chamber, and cover the radiating groove recesses to define closed feeder tubes from said filling gates to said mold chamber, and means for pressing a piece of sheeted plastic flatwise against said back surface to cause the plastic to flow through said plurality of filling gates into the mold cavity, said means comprising a second molding couple having substantially the characteristics defined for said first molding couple, whereby said first and second molding couples thereby are movable toward one another to squeeze a sheet of flowable material therebetween and force the material into all said filling gates and feeder tubes simultaneously to fill the chambers.

2. Molding apparatus comprising, a first and a second molding couple, each molding couple including a first mold plate section having a contact surface defining a flat plane, said first mold plate section having at least a mold cavity extending inwardly thereof from the said contact surface, and each said molding couple including a second mold plate section having a contact surface defining a flat plane, said second mold plate section having at least a mold cavity extending inwardly thereof from the said contact surface, at least one of said plate sections in each couple having a plurality of groove recesses each radiating outwardly from said cavity therein, said second mold plate having a back surface and having a plurality of filling gates each having a large opening through the second mold plate from the said back surface to a small opening at the contact surface, said contact surfaces of the first and second mold plate sections being removably positioned in close fitting engagement with said mold cavities in registration defining at least a molding chamber, said radiating groove recesses defining feeder tubes from said small openings of the filling gates to said at least a molding chamber, said first and second molding couples being removably positioned together with the said back surfaces of the respective second mold plates movable toward one another to squeeze a sheet of flowable material therebetween and force the material into all said filling gates and feeder tubes simultaneously to fill said at least a chamber in each molding couple, and means to resist escape of said flowable material from between said back surfaces.

3. Molding apparatus comprising, a first and a second molding couple, each molding couple including mold plates adapted to be preliminarily mated in close fitting contact to define a plurality of molding chambers with a plurality of radiating feeder tubes extending therefrom, each tube of each chamber extending to a terminus, said terminus also being the terminus for a tube extending from another chamber, one of said mold plates being formed with a multiplicity of filling gates each extending from an external face thereof through said plate to one said terminus, said first and second molding couples being removably positioned with the said external faces thereof movable toward one another to squeeze a sheet of uncured rubber compound therebetween, whereby said sheet of uncured rubber may be intially interlocked with said external faces by pressing a portion from said sheet into each said filling gate opening and thereby resist side movement of the sheet in the plane of said external face, and may thereafter be further squeezed to force the rubber compound into each filling gate and through said feeder tubes into said molding chambers.

4. Molding apparatus comprising a pair of mold sections adapted to be mated in close-fitting relation to define a mold cavity, one of said sections being formed with a filling aperture extending from an external face thereof to said cavity, means for so pressing a piece of sheeted plastic flatwise against said external face as to cause the plastic to flow through said filling aperture into the mold cavity, said means comprising a second pair of mold sections having substantially the characteristics just defined as to the first pair, and guard means on a section of at least one of the pairs for resisting escape of plastic from between the two pairs of mold sections.

5. Molding apparatus comprising a pair of mold sections adapted to be mated in close-fitting relation to define a mold cavity, one of said sections being formed with a filling aperture extending from an external face thereof to said cavity, means for so pressing a piece of sheeted plastic flatwise against said external face as to cause the plastic to flow through said filling aperture into the mold cavity, said means comprising a second pair of mold sections having substantially the characteristics just defined as to the first pair, and means for resisting escape of plastic from between the two pairs of mold sections.

MAURICE E. NYE.
HARRY E. NYE.

REFERENCES CITED

The following references are of record in the file of this patent:

UNITED STATES PATENTS

| Number | Name | Date |
| --- | --- | --- |
| 1,919,534 | Shaw | July 25, 1933 |
| 1,997,074 | Novotny | Apr. 9, 1935 |
| 2,043,584 | Husted | June 9, 1936 |
| 2,072,349 | Wayne | Mar. 2, 1937 |
| 2,452,382 | Long | Oct. 26, 1948 |